United States Patent
Moradi et al.

(10) Patent No.: US 10,608,914 B2
(45) Date of Patent: Mar. 31, 2020

(54) METHODS AND DEVICES FOR MONITORING OF NETWORK PERFORMANCE FOR CONTAINER VIRTUALIZATION

(71) Applicant: TELEFONAKTIEBOLAGET LM ERICSSON (PUBL), Stockholm (SE)

(72) Inventors: Farnaz Moradi, Stockholm (SE); Andreas Johnsson, Uppsala (SE); Catalin Meirosu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 203 days.

(21) Appl. No.: 15/560,546

(22) PCT Filed: Apr. 1, 2015

(86) PCT No.: PCT/EP2015/057206
§ 371 (c)(1),
(2) Date: Sep. 22, 2017

(87) PCT Pub. No.: WO2016/155816
PCT Pub. Date: Oct. 6, 2016

(65) Prior Publication Data
US 2018/0123928 A1    May 3, 2018

(51) Int. Cl.
*H04L 12/26* (2006.01)
*G06F 11/30* (2006.01)
(Continued)

(52) U.S. Cl.
CPC .......... *H04L 43/0852* (2013.01); *G06F 11/30* (2013.01); *G06F 11/301* (2013.01);
(Continued)

(58) Field of Classification Search
None
See application file for complete search history.

(56) References Cited

U.S. PATENT DOCUMENTS

| 7,646,725 B1 | 1/2010 | Soukup et al. |
| 2012/0203890 A1* | 8/2012 | Reynolds ............ G06F 11/3495 709/224 |

(Continued)

OTHER PUBLICATIONS

Docker, "Docker 1.5: IPv6 Support, Read-Only Containers, Stats, 'Named Dockerfiles' and More," Docker Blog, Feb. 10, 2015, http://blog.docker.com/2015/02/docker-1-5-ipv6-support-read-only-containers-stats-named-dockerfiles-and-more/.

(Continued)

*Primary Examiner* — Brian Whipple
(74) *Attorney, Agent, or Firm* — Patent Portfolio Builders PLLC

(57) ABSTRACT

It is disclosed a server node, a virtual container and methods performed therein for establishing a monitoring function monitoring performance metrics of data traffic of a first task container in a virtual environment. The methods comprise instantiating a monitoring function, receiving data traffic, communicated between the first task container and a second task container, which data traffic is mirrored to a monitoring container. The methods also comprise executing the monitoring function monitoring the performance metrics of the mirrored data traffic. Monitoring and task processes are separated, which allows multiple VNFs to share the same monitor reducing overhead. The disclosure allows for an automatic instantiation and configuration of monitor functions deployed in containers, eliminating the need for manual selection of measurement points, and thus reducing operational expenditure.

31 Claims, 7 Drawing Sheets

(51) Int. Cl.
  *G06F 11/34* (2006.01)
  *H04L 12/24* (2006.01)
  *H04L 12/931* (2013.01)

(52) U.S. Cl.
  CPC ...... *G06F 11/3006* (2013.01); *G06F 11/3419* (2013.01); *H04L 43/106* (2013.01); *G06F 11/3466* (2013.01); *H04L 41/0813* (2013.01); *H04L 49/70* (2013.01)

(56) References Cited

U.S. PATENT DOCUMENTS

| | | | |
|---|---|---|---|
| 2012/0304175 A1 | 11/2012 | Damola et al. | |
| 2014/0201374 A1* | 7/2014 | Ashwood-Smith | H04L 49/70 709/226 |
| 2014/0317261 A1 | 10/2014 | Shatzkamer et al. | |

OTHER PUBLICATIONS

Github, "cAdvisor," retrieved from the Internet Mar. 31, 2015, http://github.com/google/cadvisor.

International Search Report and Written Opinion dated Nov. 17, 2015 in related International Application No. PCT/EP2015/057206.

Kompella et al., "Every Microsecond Counts: Tracking Fine-Grain Latencies with a Lossy Difference Aggregator," ACM SIGCOMM 2009 Conference on Data Communication, pp. 255-266, SIGCOMM '09, Aug. 17-21, 2009, Barcelona, ES.

Lee et al., "Fine-Grained Latency and Loss Measurements in the Presence of Reordering," ACM SIGMETRICS Performance Evaluation Review, pp. 289-300, SIGMETRICS '11, Jun. 7-11, 2011, San Jose, CA, USA.

Lee et al., "MAPLE: A Scalable Architecture for Maintaining Packet Latency Measurements," Proceedings of the 12th ACM SIGCOMM Conference on Internet Measurement, pp. 101-114, ICM '12, Nov. 14-16, 2012, Boston, MA, USA.

Lee et al., "Not All Microseconds are Equal: Fine-Grained Per-Flow Measurements with Reference Latency Interpolation," ACM SIGCOMM 2010 Conference, pp. 27-38, SIGCOMM '10, Aug. 30-Sep. 3, 2010, New Delhi, IN.

SFLOW, "Docker performance monitoring," sFlow Blog, Jun. 26, 2014, http://blog.sflow.com/2014/06/docker-performance-monitoring.html.

Shahzad et al., "Noise Can Help: Accurate and Efficient Per-flow Latency Measurement without Packet Probing and Time Stamping," SIGMETRICS the 2014 ACM International Conference on Measurement and Modeling of Computer Systems, pp. 207-219, SIGMETRICS '14, Jun. 16-20, 2014, Austin, TX, USA.

* cited by examiner

METHODS AND DEVICES FOR MONITORING OF NETWORK PERFORMANCE FOR CONTAINER VIRTUALIZATION

TECHNICAL FIELD

This disclosure relates to monitoring of network performance. In more particular, it relates to a server node and a virtual container, and methods thereof enabling monitoring performance metrics of a virtual task container.

BACKGROUND

Virtualization is one way to decouple software applications from an underlying hardware. The most common way of virtualization is to run a hypervisor either directly on an underlying hardware or on top of a host operating system (OS). A hypervisor emulates the hardware, allowing many virtual machines (VMs) to run on the same hardware. Each such VM is isolated from said other VMs and runs a full OS. Different VMs on the same hardware can run different OSs.

In contrast to hypervisors, containers are light weight and have much lower overhead. In container-based virtualization, also known as operating system level virtualization, containers share one and the same kernel, rather than running different OSs.

In Linux containers, the kernel-level namespaces are used for resource isolation and control groups (cgroups) are used for managing and limiting resources. Cgroups also expose resource usage metrics such as memory, central processing unit (CPU), and block input/output (I/O), which can be used for monitoring.

Container-based virtualization provides better resource utilization as compared to VMs since idle containers do not use any resources, whereas VMs do. Moreover, containers can be created and destroyed much faster as compared to VMs, since there is no need to boot and shutdown a full OS.

Some examples of container-based virtualization technologies in Linux are OpenVZ, Linux VServer, LXC, and Docker. More recent container virtualization projects include LXD and Rocket.

Communication between containers can take place using different methods. For example, Docker by default creates a virtual Ethernet bridge inside the kernel on the host machine. Data traffic on this virtual Ethernet bridge can be forwarded to every interface that is connected to it. When a new container is created, a pair of peer interfaces may be created. One of the peers becomes the interface for the container and the other ones can be bound to the default Docker Bridge or any other virtual bridge on the host machine. Containers running on different hosts, or server nodes, can communicate with each other via a virtual switch.

Existing tools for monitoring containers can only gather metrics about the containers themselves running on a host machine such as CPU, memory, block I/O usage. These metrics can be obtained from cgroups. Network metrics that can be collected per interface are limited to the number of packets and bytes received/transmitted from an interface.

There are a number of tools for monitoring Linux containers, particularly Docker containers, but none of these tools provide latency monitoring. Docker version 1.5 [Ref. 1] has introduced a statistics application programming interface (API) that can provide access to a live stream of CPU, memory, network I/O and block I/O for running containers. Another example is CAdvisor [Ref. 2] that can create a monitoring container to monitor resource usage of running containers on a host. A further example is sFlow that has added support for Docker containers to obtain standard sFlow performance metrics for Linux containers [Ref. 3].

Due to emerging latency-sensitive applications, there is an increasing need for latency monitoring. Latency monitoring can be performed using two basically different measurement methods. One can be considered to be an active measurement method, and the other a passive measurement method.

Active measurement methods are based on injecting probe packets into network traffic and monitoring these injected probe packets. In passive measurement, in contrast, network traffic is being observed without injecting probe packets. A common assumption in passive latency measurement methods, is that the communicating sender and receiver are tightly synchronized in time.

A variety of different passive latency measurement methods have recently been proposed. LDA [Ref. 4] can provide aggregate latency measurements across all packets passing through two observation points. FineComb [Ref. 5] can provide end-to-end aggregate loss and latency measurements between edge routers by taking care of packet re-orderings.

Flow-aggregated latency measurements cannot resolve latency experienced by different flows. For the purpose of resolving latencies in different flows, per-flow latency measurement methods can be used. RLI [Ref. 6] can obtain per-flow measurements. However, this technique requires injecting reference packets into the data traffic.

MAPLE [Ref. 7] presents an architecture for latency monitoring where the granularity of measurements can be selected. However, it is therein assumed that network packets can carry timestamps.

Finally, COLATE [Ref. 8] provides a per-flow latency monitoring scheme which does not require the use of any probes or timestamps. However, this scheme consists of a recording phase and a querying phase and is not designed for real-time latency measurements.

As mentioned above, existing container monitoring platforms, such as cAdvisor, are limited to the monitoring of fairly simple network properties such as counting packets and bytes in and out of a container. It is mentioned that data packet delay and jitter are examples of metrics, which are not properly supported by the current monitoring approaches, for the reasons as described below.

Monitoring per-flow metrics using Host sFlow requires executing a daemon in the host that executes the containers and enabling sFlow support on the open virtual switch (OVS) infrastructure that interconnects the containers. It is a drawback that sFlow does not allow evaluating delay and jitter, and packet loss evaluation is local to the port being observed, which means that no end-to-end measurement is made possible.

Moreover, provisioning sFlow in an OVS instance connected to the container requires the container orchestration framework to have information about which switch is connected to which container, where this information could be local to the orchestration or contained in a network controller, and then communicate this information with the sFlow daemon. This is usually a management task that is performed outside of the control plane, largely in a manual or automated-through-scripts manner. This way of operation increases the reaction times to both unforeseen problems and normal events, such as migration, which may affect the lifecycle of a container.

Monitoring network activity of containers for virtualization is known and allows mainly for counting bytes and packets communicated to or from a container. More complex monitoring, for example, for observing per-flow packets and bytes, or calculating metrics such as packet loss, delay and jitter, requires cooperation from virtual or physical switches through which container communicates. Achieving such cooperation involves a complex interaction between cloud and network orchestration and provisioning platforms. Apart from the complexity of the interaction, this would also be inefficient in terms of reaching short, for example sub-second, reaction times to problems or regular changes such as container migrations or re-instantiations on different hardware.

There is hence a need for a solution addressing one or more of the issues as discussed above.

SUMMARY

It is an object of exemplary embodiments to address at least some of the issues outlined above, and this object and others are achieved by a server node and a virtual container and methods performed therein, according to the appended independent claims, and by the exemplary embodiments according to the dependent claims.

According to an aspect, the exemplary embodiments provide a method performed by a server node for establishing a monitoring function monitoring performance metrics of data traffic of a first task container in a virtual environment. The method comprises providing a first monitoring container adapted to execute the monitoring function, when a task of the first task container has started. The method comprises instantiating the monitoring function in the first monitoring container. The method also comprises mirroring data traffic addressed to, or originating within, the first task container, to the first monitoring container. In addition, the method comprises executing the monitoring function in the first monitoring container monitoring the performance metrics of the data traffic being mirrored.

According to another aspect, the exemplary embodiments provide a method performed by a monitoring container, for executing a monitoring function monitoring performance metrics of data traffic of a first task container. The method comprises receiving an instantiation message to instantiate the monitoring function. The method comprises instantiating the monitoring function in the monitoring container. The method also comprises receiving data traffic, communicated between the first task container and a second task container, which data traffic is mirrored to the monitoring container, by a switch that is attached to the first task container. In addition, the method also comprises executing the monitoring function monitoring the performance metrics of the mirrored data traffic.

According to another aspect, the exemplary embodiments provide a server node that is configured to establish a monitoring function to monitor performance metrics of data traffic of a first task container in a virtual environment. The server node comprises a processor, and a memory storing a computer program comprising computer program code which when run in the processor, causes the server node to provide a first monitoring container adapted to execute the monitoring function, when a task of the first task container has started. When run in the processor, the computer program code causes the server node to instantiate the monitoring function in the first monitoring container. When run in the processor, the computer program code also causes the server node to mirror data traffic addressed to, or originated within, the first task container, to the first monitoring container. When run in the processor, the computer program code also causes the server node to execute the monitoring function in the first monitoring container monitoring the performance metrics of the data traffic being mirrored.

According to another aspect, the exemplary embodiments provide a server node that is configured to establish a monitoring function to monitor performance metrics of data traffic of a first task container in a virtual environment. The server node comprises a monitoring unit, a task executing unit and a switching unit. The monitoring unit is adapted to provide a first monitoring container adapted to execute the monitoring function, when a task of the first task container has started. The monitoring unit is also adapted to instantiate the monitoring function in the first monitoring container. The switching unit is adapted to mirror data traffic addressed to, or originating within, the first task container, to the first monitoring container. The task executing unit is adapted to execute the monitoring function in the first monitoring container monitoring the performance metrics of the data traffic being mirrored.

According to yet another aspect, the exemplary embodiments provide a server node configured to establish a monitoring function monitoring performance metrics of data traffic of a first task container of the server node. The server node is adapted to provide a first monitoring container adapted to execute the monitoring function, when a task of the first task container has started. The server node is also adapted to instantiate the monitoring function in the first monitoring container. The server node is also adapted to mirror data traffic addressed to, or originating within, the first task container, to the first monitoring container. In addition, the server node is adapted to execute the monitoring function in the first monitoring container monitoring the performance metrics of the data traffic being mirrored.

According to yet another aspect, the exemplary embodiments provide a virtual container adapted to execute a monitoring function monitoring performance metrics of data traffic of a first task container. The virtual container is further adapted to receive an instantiation message to instantiate the monitoring function. The virtual container is further adapted to instantiate the monitoring function in the virtual container. The virtual container is further adapted to receive data traffic communicated between the first task container and a second task container, which data traffic is mirrored to the virtual container by a switch that is attached to the first task container. In addition, the virtual container is adapted to execute the monitoring function monitoring the performance metrics of the mirrored data traffic.

The expression "container" as used herein is understood to denote either a "container" or a "virtual machine".

ADVANTAGES OF EXEMPLARY EMBODIMENTS

It is an advantage to separate monitoring functionality and task processes, such as VNF processes, which allows multiple VNFs to share the same monitor reducing overhead.

It is advantageous that the present disclosure allows for an automatic instantiation and configuration of monitor functions deployed in containers, eliminating the need for manual selection of measurement points, and thus reducing operational expenditure (OPEX) by eliminating the need for manual work and significantly reducing the possibility of configuration errors.

It is an advantage that the automatic discovery of remote monitors is well adapted to virtualized infrastructure that supports migration and automatic failover of the VNFs, providing uninterrupted monitoring without manual intervention.

It is also beneficial that the monitoring related methods herein presented have a fairly low overhead in terms of use of computational resources, mainly due to data packet copy operations which can be accelerated in particular operating systems.

It is further highly advantageous that the latency metric calculation method herein presented does not generate probe packets in the data plane, and therefore does not impact customer traffic. It also simplifies the implementation of the data plane, as other protocols often require special tags or identifiers in order to identify probe packets.

It is further an advantage that the amount of traffic introduced on the control/management plane is configurable and affects only the timeliness of the metric measurements for latency, not their accuracy.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

To the best of our knowledge none of the existing monitoring techniques for containers provide latency monitoring for processes such as virtual network functions (VNFs) running in containers.

It is herein disclosed a server node, a virtual container and methods therein for enabling a container management framework to, upon receipt of a request to instantiate a task container that is to be used to execute a virtual network function, provide a monitoring container associated with the task container, and to instantiate execution of a monitoring function within the monitoring container.

The monitoring function may then use the container management framework, or a parallel management overlay, to automatically discover which other containers need, or is, to be monitored based on data extracted from data traffic addressed to or generated by the VNF of the task container. The monitoring function may determine the Internet protocol (IP) address of end points of data flows for monitoring.

Figure 1:
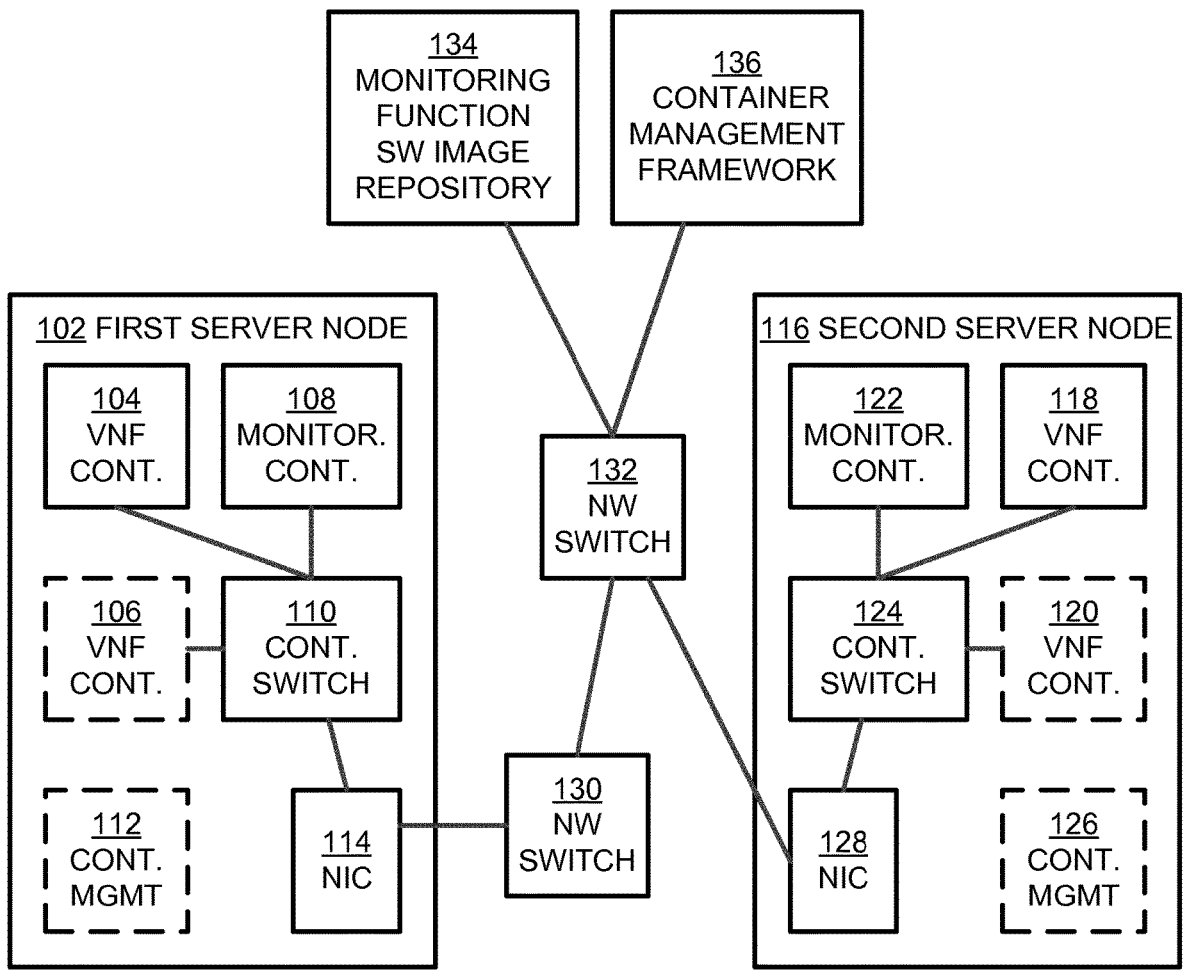
FIG. 1 schematically presents an architecture for container virtualization of monitoring functionality related to exemplary embodiments.

FIG. 1 shows an architecture of a container monitoring framework for container virtualization of monitoring functionality related to exemplary embodiments.

The container monitoring framework of this example comprises a first server node 102, a second server node 116, network switches 130, 132, a monitoring function software image repository 134, and a container management framework 136.

The first server node 102 according to this example comprises a virtual network function (VNF) 104, an optional VNF container 106, a monitoring container 108, a container bridge or switch 110, a container management 112 and a network interface controller (NIC) 114. The container management 112 may alternatively be located outside the first server node 102. Moreover, the VNF container 106 may be seen as a representation of one of more additional VNF containers connected to the container bridge 110, and thereby being associated with the monitoring container 108.

Similarly, a second server node 116 according to this example comprises a VNF container 118, an optional VNF container 120, a monitoring container 122, a container bridge or switch 124, a container management 126 and a NIC 128. The container management 126 may alternatively be located outside the first server node 116. Moreover, the VNF container 120 may be seen as a representation of one of more additional VNF containers connected to the container bridge 124, and thereby being associated with the monitoring container 122.

Moreover the first server node 102 is in this example connected to a network via a network switch 130, whereas the second server node 116 is connected to the network via a network switch 132 that is connected to network switch 130. Network switch 132 may further connected to a monitoring function software image repository 134, and a container management framework 136.

In order to monitor a network performance metric between two containers, for example VNF container 104 and VNF container 118, executing VNFs, a monitoring container 108 can be instantiated and attached to the VNF container 104. Also, a monitoring container 122 may be instantiated and attached to the VNF container 118. The instantiation of the monitoring containers 108 and 122 may be performed by the container management framework 136. As indicated in FIG. 1, a monitoring container can monitor more than one VNF container within the same server node. For instance, the monitoring container 108 can monitor VNF container 104 and VNF container 106, both within the first server node 102. Similarly, the monitoring container 122 can monitor VNF container 118 and VNF container 120, both within the second server node 116.

The container switch or bridge 110 may be configured to mirror traffic such as data traffic originated within the VNF container 104 to a switch port to which the monitoring container 108 is attached. Mirroring of traffic may, for example, be performed by means of configuring port mirroring. Software executing in the monitoring container 108 may hereby passively monitor or observe the traffic generated by the VNF container 104.

Based on policy or the metric that is to be measured, traffic address to the VNF container 104 may also be mirrored to the monitoring container 108 using the same mechanism.

As mirroring traffic addressed to and traffic originating within the VNF container 104 can be fairly resource intensive in a naïve implementation, acceleration techniques through the use of zero-copy libraries such as Libzero available in Linux, may be used.

A monitoring function may be instantiated within both the monitoring container 108 and the monitoring container 122. This may be done by executing a software image retrieved from the monitoring function software image repository 134. This monitoring function software image repository

134 may need to be accessible from the monitoring containers 108 and 122, although it may be either centralized, for a particular operational or administrative domain, or local to each of the servers involved.

Figure 2A:
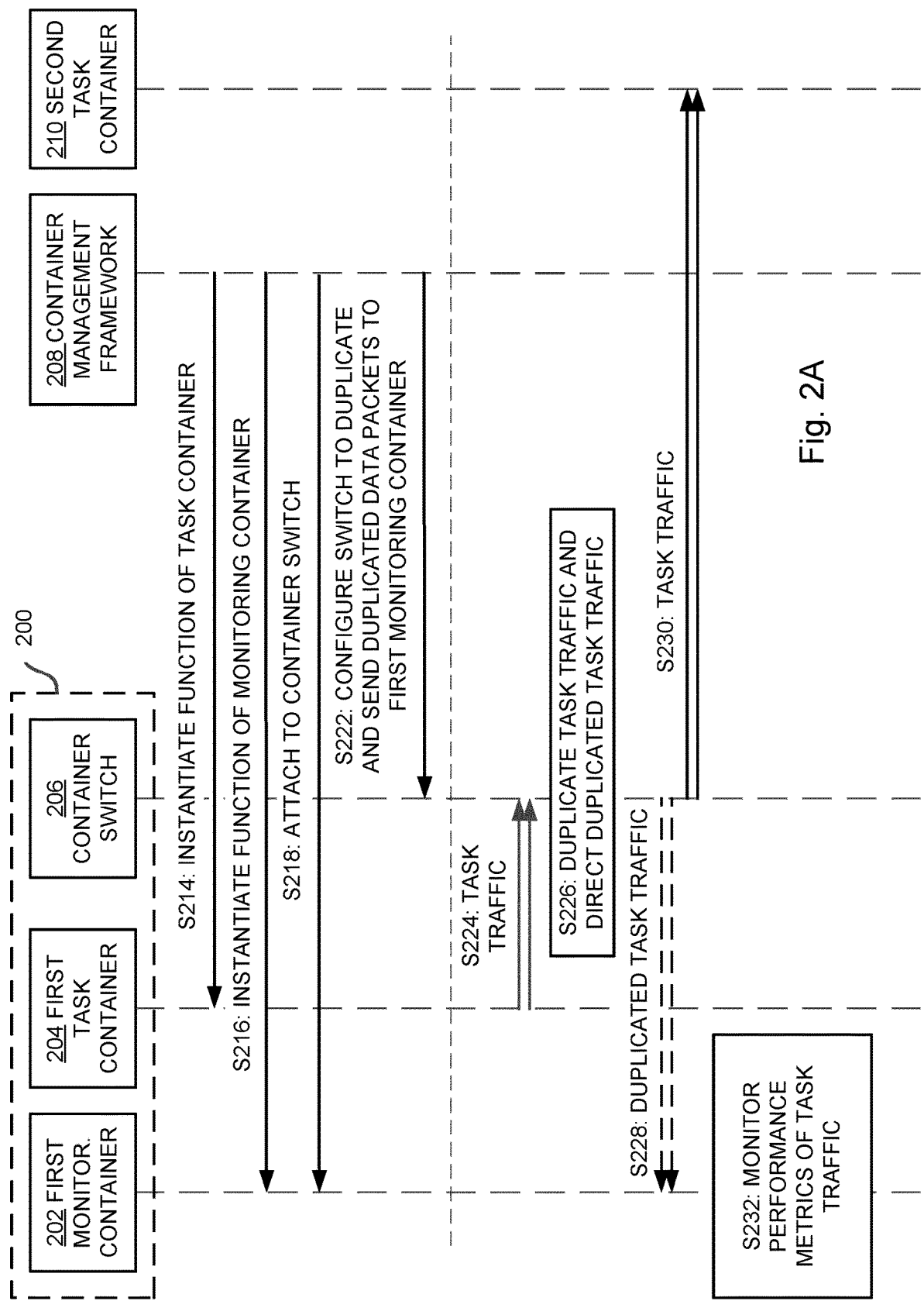
FIGS. 2A-2C present handshake diagrams of messages for monitoring of data traffic, according to exemplary embodiments.

FIG. 2A presents a handshake diagram of messages for monitoring of data traffic, according to exemplary embodiments. The diagram comprises actions involving a server node 200, in which a first monitoring container 202, a first task container 204, and a container switch 206 resides, as well as a container management framework 208 and a second task container 210. The second task container may be located outside the server node 200, as illustrated in FIG. 2A, or alternatively, be located within the server node 200.

In S214, the container management framework instantiates a function of the first task container 204. This function may be a virtual network function (VNF), and the first task container may be a VNF container. In S216 the container management framework 208 may instantiate a function of the first monitoring container 202.

In S218 the container management framework 208 may send an attachment message instructing the first monitoring container to attach to the container switch 206.

In S222 the container management framework 208 may configure the container switch 206 to duplicate data packets from data traffic reached the container switch, send duplicated data packets to the first monitoring container 202.

If there is no first monitoring container 202 within the server node 200, the container management framework 208 may instantiate one. If already a monitoring container exists in the server node 200, upon instantiating a function of the first task container 204, this already existing monitoring container may be used for monitoring data traffic of the first task container.

When a monitoring container 202 is provided, the container switch may determine which switch it is connected to, and where the first task container 204 connects to the switch. The monitoring container 202 may then connect to the container switch 206. Then, as described above, the container management framework 208 may configure the container switch 206 to duplicate data packets and send the duplicated data packets to the first monitoring container 202. Either all data packets reached by the container switch 206 are duplicated, or only selected data packets based on a hash function, a network tuple, and an identity of the first task container and optionally also or alternatively based on an identity of the second task container 210 to or from which data packets are communicated with the first task container 204.

Having configured the container switch 206, the monitoring function may be instantiated in S216.

It has thus been described how a monitoring function may be instantiated in the first monitoring container 202.

Having instantiated the monitoring function in the first monitoring container 202, task traffic, or data traffic, generated by the first task container 204 is communicated S224 to the container switch 206 towards the second task container 210. The container switch 206 may now duplicate S226 the task traffic and direct the duplicated task traffic.

Task traffic, or data traffic, may alternatively be generated by the second task container 210 and received by the first task container 204.

As mentioned above, the container switch 206 may select task traffic to duplicate, so that all task traffic does not need to be duplicated. In S228 the task traffic that is duplicated is sent to the first monitoring container 202. It will now be described how data traffic generated by the first task container 204 can be mirrored to the first monitoring container 202.

In S230, the data traffic that reached the container switch 206 is forwarded to the second task container 210. The data traffic as communicated in S230 may thus comprise more data than the duplicated task traffic as communicated in S228.

In S232 the first monitoring container may thus monitoring performance metrics of task traffic that was duplicated and sent to the first monitoring container 202.

Figure 2B:
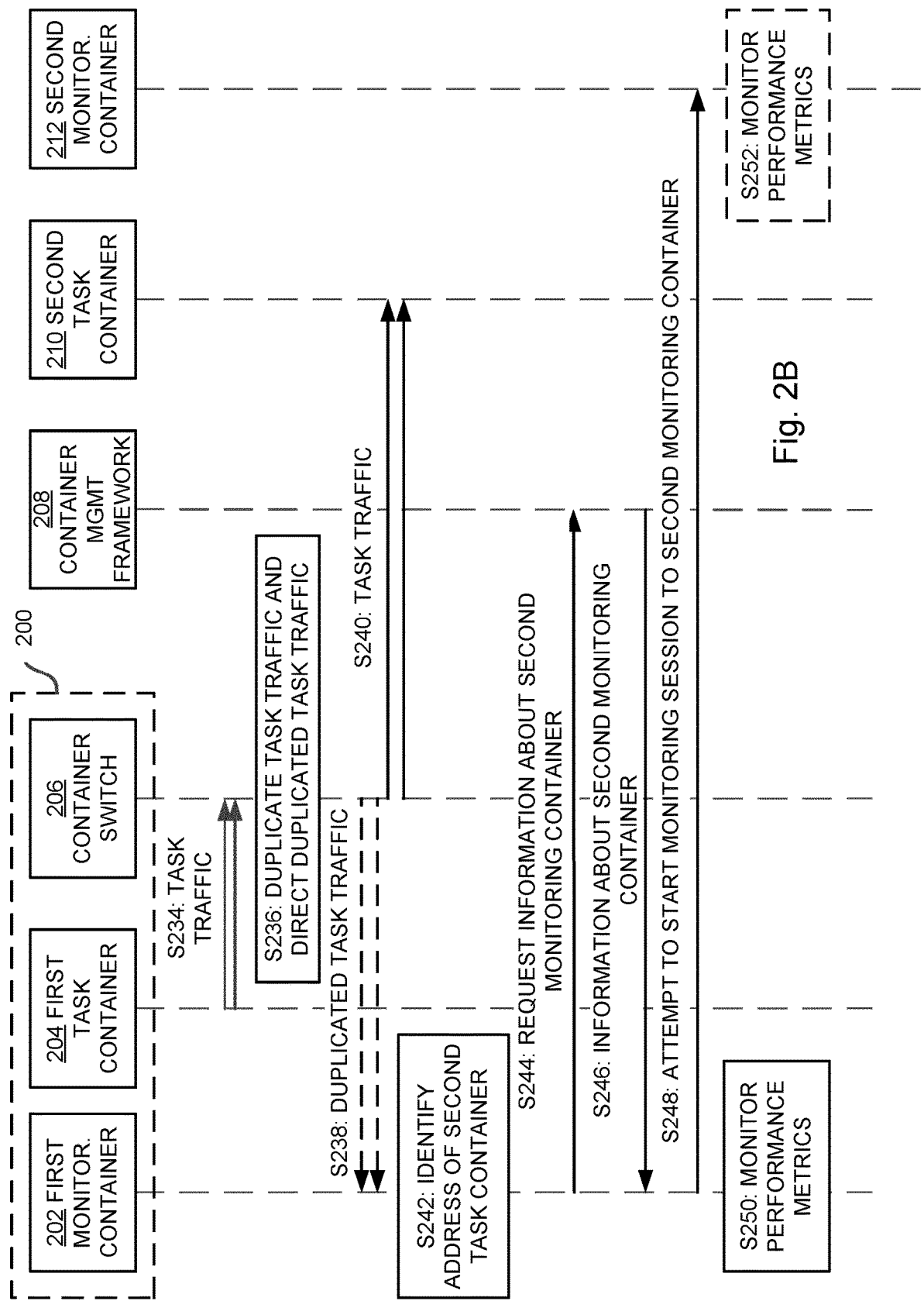

FIG. 2B presents a handshake diagram of messages for monitoring of data traffic, according to exemplary embodiments. The diagram comprises actions involving a server node 200, in which a first monitoring container 202, a first task container 204, and a container switch 206 resides, as well as a container management framework 208, a second task container 210 and a second monitoring container 212. Even though the second task container 210 is illustrated to be located outside the server node 200, in FIG. 2B, it may alternatively be located within said server node 200.

As will be described below monitoring of task traffic as described in FIG. 2B may be performed by both a first monitoring container 202 attached to a first monitoring container 202, but as well also by a second monitoring container 212 that can be attached to a second task container 210.

The handshake diagram of FIG. 2B may be considered to be a continuation of a first part S214-S222 of the handshake diagram of FIG. 2A.

The first step in FIG. 2B, that is S234 of communicating task traffic by the first task container 204 to the container switch 206 corresponds to the S224 of FIG. 2A. Also, steps S236-S240 correspond to steps S226-S230 of FIG. 2A, for which reason reference is made to FIG. 2A for steps S234-S240.

For FIG. 2B, a virtual network interface of the container switch 206 and attached to the first monitoring container 202, may be configured in promiscuous mode, such that the container switch 206 will mirror all task traffic that reaches the network interface.

In S242 the first monitoring container may examine the duplicated traffic provided in S238, and identify an Internet protocol (IP) address of the second task container 210, using packet header fields as determined from the configuration.

The IP address of the second task container 210 may alternatively be made available to the first monitoring container 202 via the container management framework 208, if a graph representing a service chain, or service graph to which the first and second task containers belong, is made available to the first monitoring container 202.

In S244 the first monitoring container 202 may request information about the second monitoring container in a request directed to the container management framework 208, which second monitoring container 212 is attached to the second task container 210. As an alternative, instead of requesting information about the second monitoring container from a centralized entity, i.e. the container management framework 208, a monitoring overlay may be used. This overlay, which can be built using distributed hash tables (DHTs) between monitoring functions of the first and second monitoring containers, may be used to query said monitoring functions to determine which instance may receive a duplicate of the data traffic.

In S246 the first monitoring container may thus receive information about the second monitoring container 212 from the container management framework.

If the IP address of the second monitoring container 212 is found, i.e. that the first monitoring container 202 discovers the second monitoring container 212, the first monitoring container 202 may send S248 an attempt to start a monitoring session towards the second monitoring container 212.

In relation to monitoring functionality depicted in FIG. 2A, it is assumed that the instantiation of the monitoring function in the first monitoring container 202 is done with a simple TCP connection.

If no IP address is found for the second monitoring container 212, absence of the IP address may be due to that the second monitoring container 212 has yet to be instantiated by the container management framework 208. For this reason the first monitoring container 202 may disable the monitoring session and await a connection from the container management framework to the second management container 212.

Also, if the attempt S248 to start monitoring session is not succeeded, the first monitoring container 202 may disable the attempted monitoring session.

If the attempted monitoring session succeeds, S250, monitor performance metrics may be executed by the first monitoring container.

Similarly, upon succeeding to establishing to the monitoring session in S248, the second monitoring container 212, monitor performance metrics may be executed by the second monitoring container 212.

After having monitored task traffic during a desired time interval, S242 of identifying an address of a second or remote task container may again be executed. Also, S244 up to S252 may be executed again, and the so formed loop of S242 to S250, or S252, may be executed a number of times.

Figure 2C:
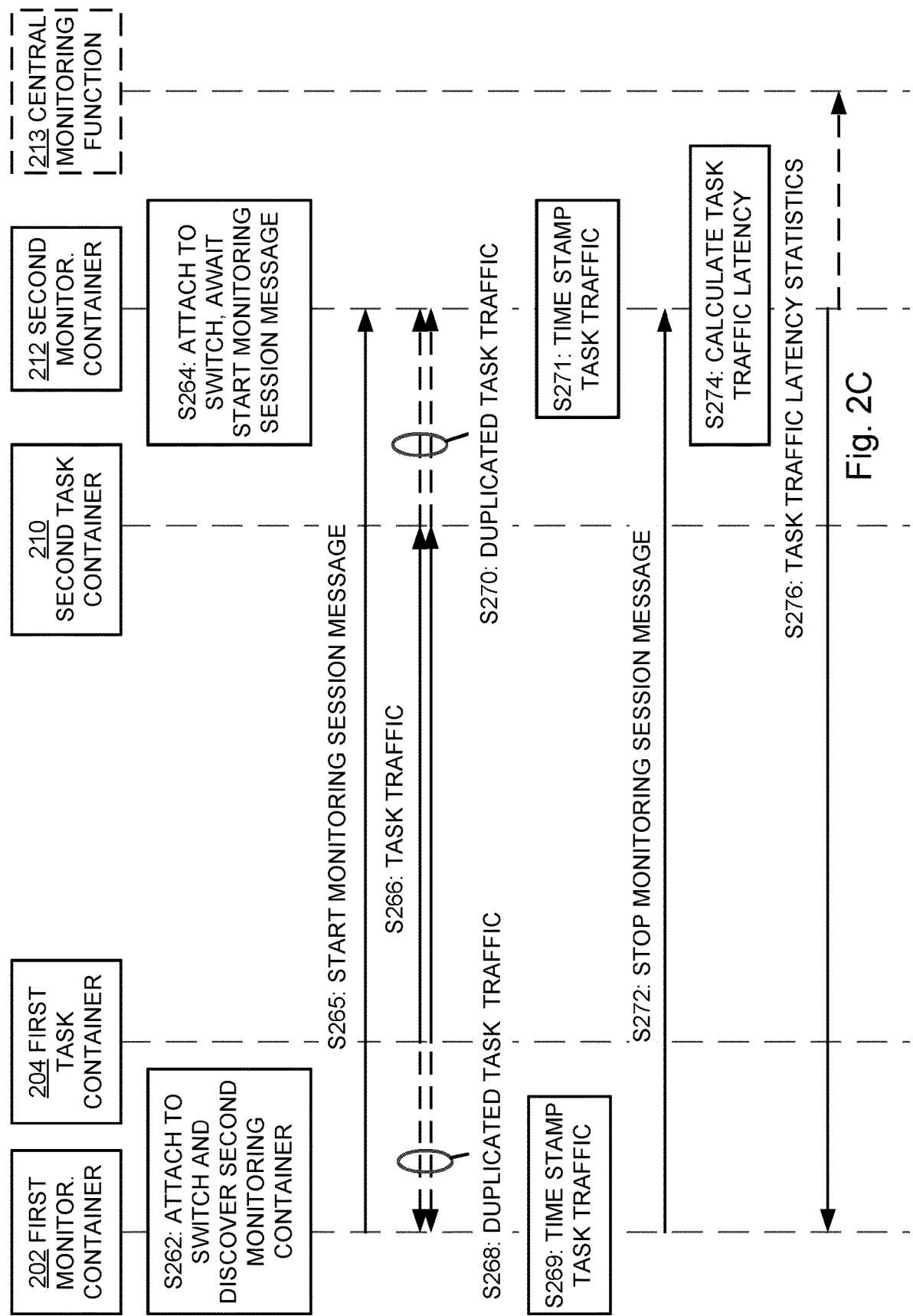

FIG. 2C presents a further handshake diagram of messages for monitoring of data traffic, according to exemplary embodiments. The diagram comprises actions involving a first monitoring container 202, a first task container 204, a second task container 210, a second monitoring container 212, as well as an optional central monitoring function 213.

FIG. 2C relates to a series of generic steps that could be employed for calculating a network metric in an efficient manner and with low configuration overhead.

Also, FIG. 2C illustrates how to calculate a performance metric in the form of latency or one-way delay metric between the first task container 204 and the second task container 210. The following disclosure also comprises a fairly detailed on how to calculate the latency metric between the first task container 204 and the second task container 210 by using monitoring functions executing in the first 202 and second 212 monitoring containers.

The handshake diagram of FIG. 2C starts with S262 in which the first monitoring container 202 attaches to a container switch (not shown) and discovers the second monitoring container 212. This step of S262 may be performed by performing steps as comprised in previous handshake diagrams as illustrated in FIG. 2B.

In S264 the second monitoring container 212 may attach to a switch and await a start monitoring session message to be sent by the first monitoring container 202.'

In S265 the first monitoring container 202 may send a start monitoring session message to the second monitoring container 212.

In S266 the first task container 204 may send task traffic, such as virtual networking function traffic, to the second task container 210. At least part of this data traffic may be duplicated by a switch to which the first monitoring container 202 is attached. Thus, in S268 duplicated task traffic is sent to the first monitoring container 202.

Monitoring of latency metric of data traffic between the first task container 204 and the second task container 210, is typically organized in time intervals, as will be described below.

In 269 the first monitoring container 202 time stamps the task traffic received.

In order to calculate a performance metric, each data packet of the data traffic which received by the first monitoring container 202 may be further copied or ignored by the first monitoring container 202.

The copied data packets may be presented to a hash function that generates a hash value. The hash value may be used to place a timestamp, corresponding to the time when each data packet was received, in a data structure stored in a cache memory located within the first monitoring container 202.

Similarly, at least part of the data traffic communicated between the first task container 204 and the second task container 210, may be duplicated by a switch to which the second monitoring container 212 is attached. For this reason, in S270 duplicated task traffic received by the second task container 210 may be received by the second monitoring container 212.

In S271 the second monitoring container 212 time stamps the received task traffic.

The monitoring functions of the first monitoring container 202 and the second, or destination, monitoring container 212, keep a copy of the data structure in their respective caches. Since both the monitoring function in the first monitoring container 202 and the monitoring function in the second monitoring container 212 use the same hash function, they will have timestamps for the same set of data packets in their cache, except for the case in which a data packet is lost.

In S272 the first monitoring container 202 may send a stop monitoring session message to the second monitoring container 212. This means an end of a session interval, the length of which can be decided by the monitoring containers. The first monitoring container 202 may now send its data structure, or the timestamp of a specific data packet or flow to the second monitoring container 212.

In S274 the second monitoring container calculates task traffic latency based on the time stamping performed by the first monitoring container 202 and the time stamping performed by the second monitoring container 212.

The second monitoring container 212, in FIG. 2C being the receiving monitoring container, typically compares its own timestamps with the timestamps of the first monitoring container, and estimates the metrics associated to the data packet or flow.

The size of the cache for the data packets may be chosen based on the amount of data traffic or the sampling rate of the data packets.

If there is a need for keeping packet timestamps for a time longer than a time duration agreed upon, the content of the cache may be stored in a permanent storage to be kept for long periods of time, if needed. This allows requesting the latency of, for instance, a specific flow during a specified time interval and receiving corresponding data structures from the permanent storage.

In S276 the second monitoring container 212 may send task traffic latency statistics to the first monitoring container 202. Optionally, the second monitoring container 212 may also send task traffic latency statistics to a central monitoring function 213.

It is advantageous that the one-way delay latency monitoring of FIG. 2C uses the traffic generated by the first (or second) task container, such as a VNF container, and does therefore not introduce probe packets in a customer data plane.

Monitoring of performance metrics such as latency metric, may optionally also comprise an online change detection technique to be used to trigger alarmed changes in the monitored metrics.

Change detection processes typically comprise a filter for filtering relevant metrics values, a distance measure with which metric values from the monitoring may be compared and a stopping rule, defining when to terminate a process of online detection.

In latency monitoring, only persistent threshold violations which may indicate non-transient problems in the network, over the first task container 204 and the second task container 210 sends data traffic, should be alarmed rather than setting an alarm whenever there is a spike/anomaly in the calculated latency metrics.

Output information from such detection methods may be used by a container orchestration framework, such as the container management framework 208, as input for taking actions or decisions.

In case monitoring of performance metrics is to be continued, new task traffic being duplicated may be monitored by the first 202 and second 212 monitoring containers, following the description from above.

Figure 3:
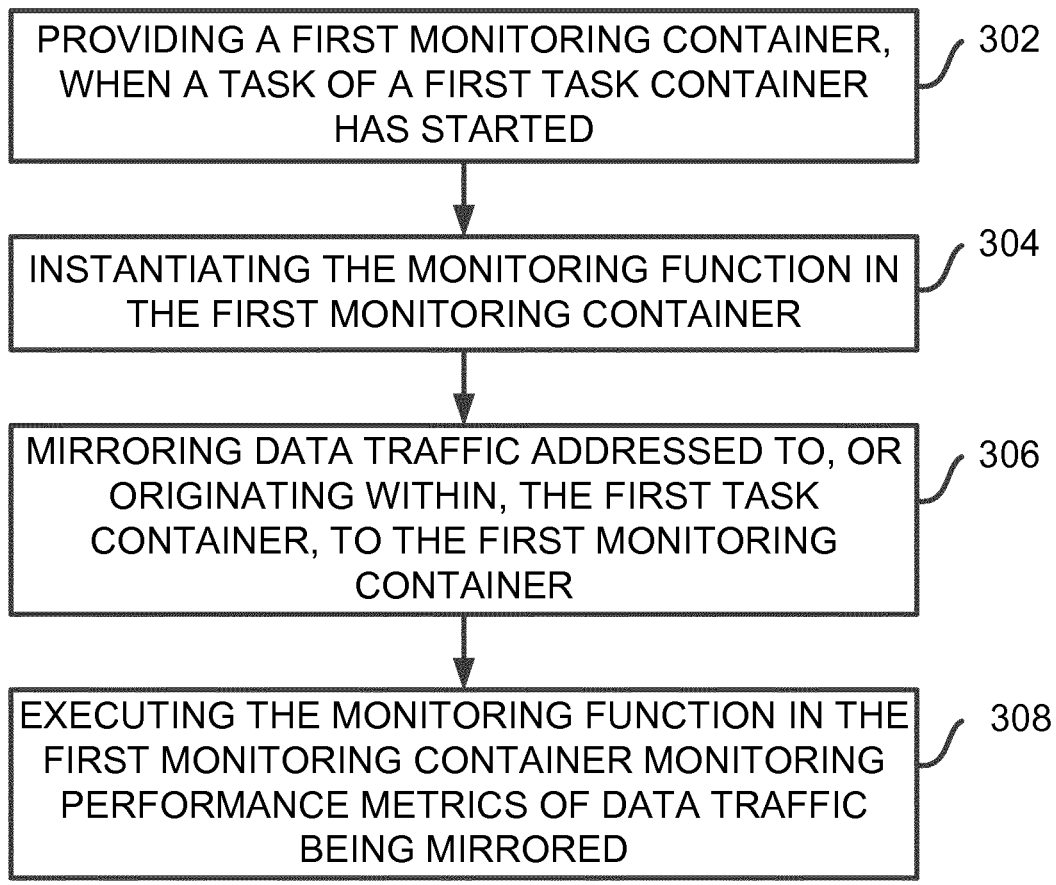
FIG. 3 illustrates a flowchart of a method performed by a server node, according to exemplary embodiments.

FIG. 3 illustrates a flowchart of a method performed by a server node 100, 200 for establishing a monitoring function monitoring performance metrics of data traffic of a first task container 104, 204 in a virtual environment. The method comprises providing 302 a first monitoring container 108, 202 adapted to execute the monitoring function, when a task of the first task container has started. The method comprises instantiating 304 the monitoring function in the first monitoring container. The method also comprises mirroring 306 data traffic addressed to, or originating within, the first task container, to the first monitoring container. In addition, the method comprises executing 308 the monitoring function in the first monitoring container monitoring the performance metrics of the data traffic being mirrored.

Mirroring 306 data traffic may comprise attaching the first monitoring container to a virtual switch 110, 206 that is attached to the first task container, and configuring the virtual switch to mirror data traffic addressed to or originating within the first task container.

Mirroring 306 data traffic may comprise mirroring selected data traffic based on one of more of: a hash function, a network tuple, and an identity of the first and/or second task container.

Providing 302 the first monitoring container may comprise instantiating S216 a monitoring container or using an already existing monitoring container within the server node.

The method wherein the data traffic addressed to, or originating within, the first task container, is originated within or addressed to, a second task container, respectively, may further comprise requesting S244 information about a second monitoring container associated with the second task container, and if receiving S246 information about the second monitoring container, instructing S248 the second monitoring container to instantiate a monitoring function monitoring said performance metrics of data traffic of the second task container.

The method may further comprise identifying an address of the second task container.

Within the method, the address of the second task container may be an address within the server node 102, 200 or within another server node 116.

Executing 308 the monitoring function may further comprise time stamping the data traffic being mirrored, and instructing the second monitoring container to instantiate a monitoring function, may further comprise instructing the second monitoring container to instantiate a monitoring function to calculate latency of the time stamped data traffic.

The method may further comprise receiving further data traffic being mirrored by the virtual switch 110, 206 being attached to another first task container 106, where said further data traffic is addressed to, or originated within said another first task container.

Within the method, the task of the first task container may comprise a virtual network function, VNF.

Figure 4:
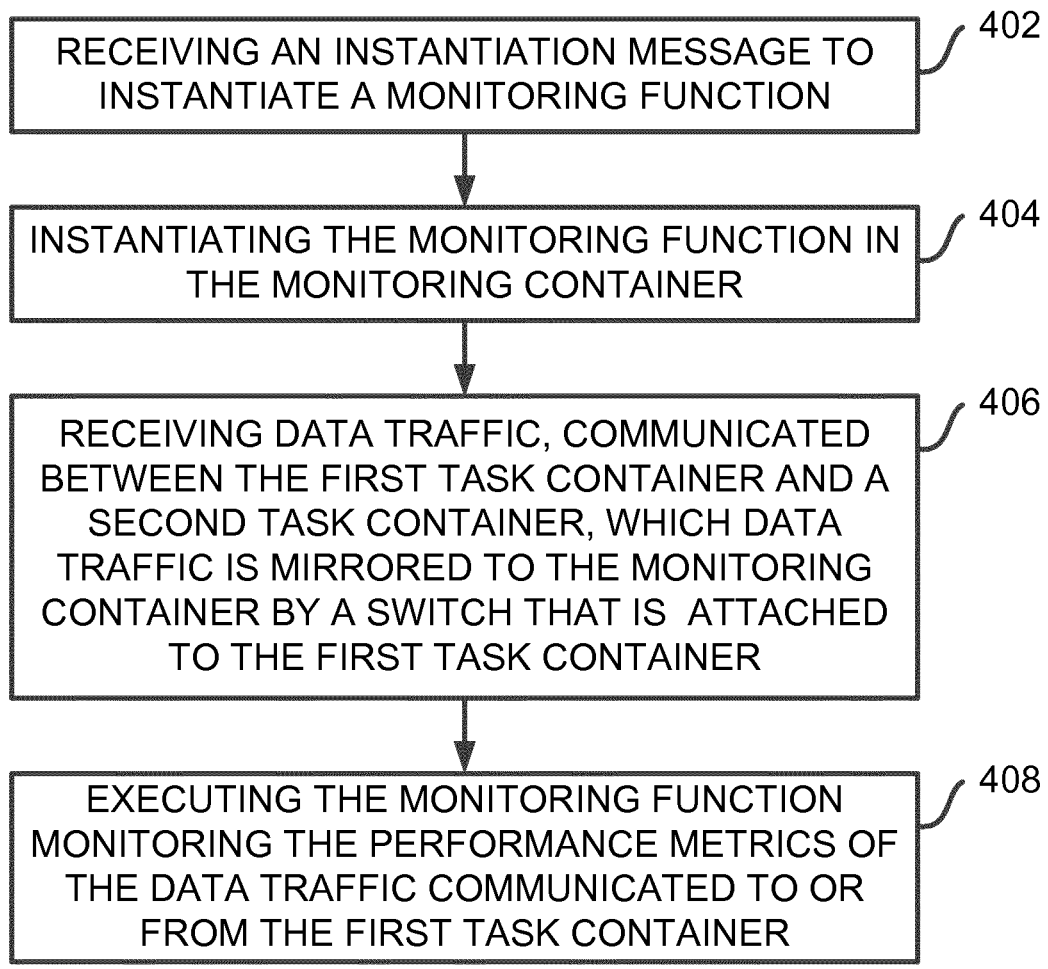
FIG. 4 illustrates a flowchart of a method performed by a virtual container, according to exemplary embodiments.

FIG. 4 illustrates a flowchart of a method performed by a monitoring container 108, 202, for executing a monitoring function monitoring performance metrics of data traffic of a first task container 104, 204. The method comprises receiving 402 an instantiation message to instantiate the monitoring function. The method comprises instantiating 404 the monitoring function in the monitoring container. The method also comprises receiving 406 data traffic, communicated between the first task container and a second task container 118, 210, which data traffic is mirrored to the monitoring container, by a switch 110, 206 that is attached to the first task container. In addition, the method also comprises executing 408 the monitoring function monitoring the performance metrics of the mirrored data traffic.

The method may further comprise receiving S218 an attachment message, said attachment message instructing the monitoring container to attach to the switch.

The method, wherein the data traffic addressed to, or originating within, the first task container, is originated within or addressed to, a second task container, respectively, may further comprise requesting S244 information about a second monitoring container associated to the second task container, and if receiving S246 information about the second monitoring container, instructing S248 the second monitoring container to instantiate a monitoring function monitoring said performance metrics of data traffic of the second task container.

The method may further comprise time stamping S269 the received data traffic, and instructing S248 the second monitoring container to instantiate a monitoring function, may further comprise instructing the second monitoring container to instantiate a monitoring function to calculate latency of the time stamped data traffic.

The method may further comprise receiving further data traffic addressed to, or originating within, another first task container 106, wherein the further data traffic is mirrored by the switch attached to said another first task container 106.

Figure 5:
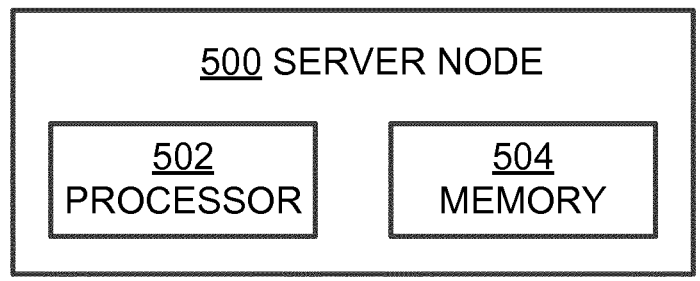
FIGS. 5 and 6 schematically illustrate server nodes, according to exemplary embodiments.

FIG. 5 schematically illustrates a server node 500 that is configured to establish a monitoring function to monitor performance metrics of data traffic of a first task container in a virtual environment. The server node comprises a processor 502, and a memory 504 storing a computer program comprising computer program code which when run in the processor 502, causes the server node 500 to provide 302 a first monitoring container adapted to execute the monitoring function, when a task of the first task container has started. When run in the processor 502, the computer program code causes the server node 500 to instantiate 304 the monitoring function in the first monitoring container. When run in the processor 502, the computer program code also causes the server node 500 to mirror 306 data traffic addressed to, or originated within, the first task container, to the first monitoring container. When run in the processor 502, the computer program code also causes the server node 500 to execute 308 the monitoring function in the first monitoring container monitoring the performance metrics of the data traffic being mirrored.

The present disclosure also comprises a computer program comprising instructions, when executed on at least one processor, cause the at least one processor to provide 302 a first monitoring container 108, 202 adapted to execute the monitoring function, when a task of the first task container has started. When executed on the at least one processor, the computer program code causes the at least one processor to instantiate 304 the monitoring function in the first monitoring container. When executed on the at least one processor, the computer program code also causes the at least one processor to mirror 306 data traffic addressed to, or originating within, the first task container, to the first monitoring container. In addition, when executed on the at least one processor, the computer program code causes the at least one processor to execute 308 the monitoring function in the first monitoring container monitoring the performance metrics of the data traffic being mirrored.

The present disclosure also comprises the computer program, wherein the carrier is one of an electronic signal, optical signal, radio signal, or a computer readable storage medium.

Figure 6:
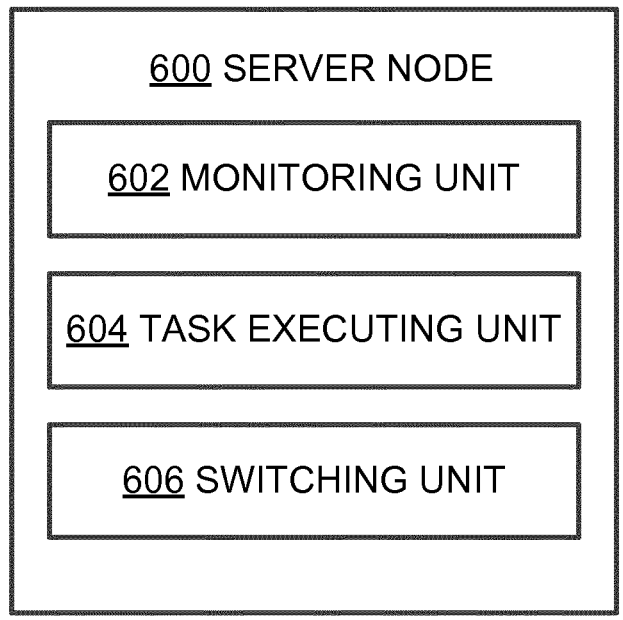

FIG. 6 schematically illustrates a server node 600 that is configured to establish a monitoring function to monitor performance metrics of data traffic of a first task container in a virtual environment. The server node 600 comprises a monitoring unit 602, a task executing unit 604 and a switching unit 606. The monitoring unit 602 is adapted to provide 302 a first monitoring container 108, 202 adapted to execute the monitoring function, when a task of the first task container has started. The monitoring unit 602 is also adapted to instantiate 304 the monitoring function in the first monitoring container. The switching unit 606 is adapted to mirror 306 data traffic addressed to, or originating within, the first task container, to the first monitoring container. The task executing unit 604 is adapted to execute 308 the monitoring function in the first monitoring container monitoring the performance metrics of the data traffic being mirrored.

The present disclosure also comprises a server node 102, 200, 500, 600 configured to establish a monitoring function monitoring performance metrics of data traffic of a first task container 104, 204 of the server node. The server node is adapted to provide 302 a first monitoring container 108, 202 adapted to execute the monitoring function, when a task of the first task container has started. The server node is also adapted to instantiate 304 the monitoring function in the first monitoring container. The server node is also adapted to mirror 306 data traffic addressed to, or originating within, the first task container, to the first monitoring container. In addition, the server node is adapted to execute 308 the monitoring function in the first monitoring container monitoring the performance metrics of the data traffic being mirrored.

The server node 102, 200, 500, 600 may further be adapted to attach the first monitoring container to a switch 110, 206 that is attached to the first task container, and to configure the switch to mirror data traffic addressed to, or originating within, the first task container.

The server node may further be adapted to mirror data traffic selected based on one of more of: a hash function, a network tuple, and an identity of first and/or second task container.

The server node 102, 200, 500, 600 may further be adapted to instantiate S216 a monitoring container or using an already existing monitoring container within the server node.

The server node 102, 200, 500, 600, where the data traffic addressed to, or originating within, the first task container, is originated within or addressed to, a second task container, respectively, may further be adapted to request S244 information about a second monitoring container associated to the second task container, and if having received S246 information about a second monitoring container, instruct S248 the second monitoring container to instantiate a monitoring function monitoring said performance metrics of data traffic of the second task container.

The server node 102, 200, 500, 600 may further be adapted to identify an address of the second task container 118, 210.

The server node 102, 200, 500, 600, wherein the address of the second task container may be an address within the server node, or an address within another server node 116.

The server node 102, 200, 500, 600, may further be adapted to time stamp the data traffic being mirrored and to instruct S248 the second monitoring container to instantiate a monitoring function to calculate latency of the time stamped data traffic.

The server node 102, 200, 500, 600 may be adapted to receive further data traffic mirrored by the virtual switch 110, 206 attached to another first task container 106, where said further data traffic is addressed to, or originated within, said another first task container.

The server node 102, 200, 500, 600 wherein the task of the first task container may comprise a virtual network function, VNF.

The present disclosure also comprises a virtual container 108, 202 adapted to execute a monitoring function monitoring performance metrics of data traffic of a first task container 104, 204. The virtual container is further adapted to receive 402 an instantiation message to instantiate the monitoring function. The virtual container is further adapted to instantiate 404 the monitoring function in the virtual container. The virtual container is further adapted to receive 406 data traffic communicated between the first task container and a second task container, which data traffic is mirrored to the virtual container by a switch 110, 206 that is attached to the first task container. In addition, the virtual container is adapted to execute 408 the monitoring function monitoring the performance metrics of the mirrored data traffic.

The virtual container 108, 202 may further be adapted to receive S218 an attachment message, and to attach to the switch, as instructed by the attachment message.

The virtual container 108, 202, where the data traffic addressed to, or originating within, the first task container, is originated within or addressed to, a second task container, respectively, may also be adapted to request S244 information about a second monitoring container associated to the second task container, and if having received S246 information about the second monitoring container, instruct S248 the second virtual container to instantiate a monitoring function monitoring said performance metrics of data traffic of the second task container.

The virtual container 108, 202 may further be adapted to time stamp the received data traffic, and to instruct the second virtual container to instantiate a monitoring function to calculate latency of the time stamped data traffic.

The virtual container 108, 202 may further be adapted to receive further data traffic addressed to or originated within another first task container 106, where the further data traffic is mirrored by the virtual switch attached to said another first task container 106.

The present disclosure also comprises a computer program comprising instructions, when executed on at least one processor, cause the at least one processor to receive 402 an instantiation message to instantiate the monitoring function. When executed on the at least one processor, the computer program code causes the at least one processor to instantiate 404 the monitoring function in the virtual container. When executed on the at least one processor, the computer program code causes the at least one processor to receive 406 data traffic communicated between the first task container and a second task container, which data traffic is mirrored to the virtual container by a switch 110, 206 that is attached to the first task container. In addition, when executed on the at least one processor, the computer program code causes the at least one processor to execute 408 the monitoring function monitoring the performance metrics of the mirrored data traffic.

It may be further noted that the above described embodiments are only given as examples and should not be limiting to the present exemplary embodiments, since other solutions, uses, objectives, and functions are apparent within the scope of the embodiments as claimed in the accompanying patent claims.

It is to be understood that the choice of interacting units or modules, as well as the naming of the units are only for exemplary purpose, and may be configured in a plurality of alternative ways in order to be able to execute the disclosed process actions. Further, the units may be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

A reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented.

The expression "container" as used herein denotes a "container" or alternatively a "virtual machine".

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

Advantages of the Present Exemplary Embodiments

It is an advantage to separate monitoring functionality and task processes, such as VNF processes, which allows multiple VNFs to share the same monitor reducing overhead.

It is advantageous that the present disclosure allows for an automatic instantiation and configuration of monitor functions deployed in containers, eliminating the need for manual selection of measurement points, and thus reducing operational expenditure (OPEX) by eliminating the need for manual work and significantly reducing the possibility of configuration errors.

It is an advantage that the automatic discovery of remote monitors is well adapted to virtualized infrastructure that supports migration and automatic failover of the VNFs, providing uninterrupted monitoring without manual intervention.

It is also beneficial that the monitoring related methods herein presented have a fairly low overhead in terms of use of computational resources, mainly due to data packet copy operations which can be accelerated in particular operating systems.

It is further highly advantageous that the latency metric calculation method herein presented does not generate probe packets in the data plane, and therefore does not impact customer traffic. It also simplifies the implementation of the data plane, as other protocols often require special tags or identifiers in order to identify probe packets.

It is further an advantage that the amount of traffic introduced on the control/management plane is configurable and affects only the timeliness of the metric measurements for latency, not their accuracy.

Thus, it may be further noted that the above described embodiments are only given as examples and should not be limiting to the present exemplary embodiments, since other solutions, uses, objectives, and functions are apparent within the scope of the embodiments as claimed in the accompanying patent claims.

Abbreviations

API application programming interface
IP Internet protocol
NIC network interface controller
OPEX operational expenditure
OS operating system
OVS open virtual switch
VM virtual machine
VNF virtual network function

REFERENCES

[1] Docker blog, http://blog.docker.com/2015/02/docker-1-5-ipv6-support-read-only-containers-stats-named-dockerfiles-and-more/, accessed 2015-04-01.
[2] cAdvisor, https://github.com/google/cadvisor, accessed 2015-04-01.
[3] Host sFlow, http://blog.sflow.com/2014/06/docker-performance-monitoring.html, accessed 2015-04-01.
[4] Ramana Rao Kompella, K. L. (2009). Every Microsecond Counts: Tracking Fine-Grain Latencies with a Lossy Difference Aggregator. ACM SIGCOMM 2009 conference on data communication, (pp. 255-266).
[5] Myungjin Lee, S. G. (2011). Fine-grained latency and loss measurements in the presence of reordering. ACM SIGMETRICS Performance Evaluation Review, 289-300.
[6] Myungjin Lee, N. D. (2010). Not all microseconds are equal: fine-grained per-flow measurements with reference latency interpolation. ACM SIGCOMM 2010 conference, (pp. 27-38).
[7] Myungjin Lee, N. D. (2012). MAPLE: A scalable architecture for maintaining packet latency measurements. Proceedings of the 12th ACM SIGCOMM Conference on Internet measurement, (pp. 101-114).
[8] Muhammad Shahzad, A. X. (2014). Noise can help: accurate and efficient per-flow latency measurement without packet probing and time stamping. SIGMETRICS the 2014 ACM international conference on measurement and modeling of computer systems, (pp. 207-219).

The invention claimed is:

1. A method performed by a server node for establishing a monitoring function monitoring performance metrics of data traffic of a first task container in a virtual environment, the method comprising:
providing a first monitoring container adapted to execute the monitoring function, when a task of the first task container has started;
instantiating the monitoring function in the first monitoring container;
mirroring data traffic addressed to or originating within the first task container, to the first monitoring container; and
executing the monitoring function in the first monitoring container monitoring the performance metrics of the data traffic being mirrored.

2. The method according to claim 1, wherein mirroring data traffic comprises attaching the first monitoring container to a virtual switch that is attached to the first task container, and configuring the virtual switch to mirror data traffic addressed to or originating within the first task container.

3. The method according to claim 2, further comprising receiving further data traffic being mirrored by the virtual switch being attached to a second task container, where said further data traffic is addressed to, or originated within the second task container.

4. The method according to claim 1, wherein mirroring data traffic comprises mirroring selected data traffic based on one of more of: a hash function, a network tuple, and an identity of the first task container and/or a second task container.

5. The method according to claim 1, wherein providing the first monitoring container comprises instantiating a monitoring container or using an already existing monitoring container within the server node.

6. The method according to claim 1, wherein the data traffic addressed to, or originating within, the first task container, is originated within or addressed to, a second task container, respectively, where the method further comprises requesting information about a second monitoring container associated with the second task container, and if receiving information about the second monitoring container, instructing the second monitoring container to instantiate a monitoring function monitoring said performance metrics of data traffic of the second task container.

7. The method according to claim 6, further comprising identifying an address of the second task container.

8. The method according to claim 7, wherein the address of the second task container is an address within the server node or within another server node.

9. The method according to claim 6, wherein executing the monitoring function, further comprises time stamping the data traffic being mirrored, and wherein instructing the second monitoring container to instantiate a monitoring function, further comprises instructing the second monitoring container to instantiate a monitoring function to calculate latency of the time stamped data traffic.

10. The method according to claim 1, wherein the task of the first task container comprises a virtual network function, VNF.

11. A method performed by a monitoring container, for executing a monitoring function monitoring performance metrics of data traffic of a first task container, the method comprising:
receiving an instantiation message to instantiate the monitoring function;
instantiating the monitoring function in the monitoring container;
receiving data traffic, communicated between the first task container and a second task container, wherein data traffic is mirrored to the monitoring container, by a switch that is attached to the first task container; and
executing the monitoring function monitoring the performance metrics of the mirrored data traffic.

12. The method according to claim 11, further comprising receiving an attachment message, said attachment message instructing the monitoring container to attach to the switch.

13. The method according to claim 11, wherein the data traffic addressed to, or originating within, the first task container, is originated within or addressed to, the second task container, respectively, where the method further comprises requesting information about a second monitoring container associated to the second task container, and if receiving information about the second monitoring container, instructing the second monitoring container to instantiate a monitoring function monitoring said performance metrics of data traffic of the second task container.

14. The method according to claim 13, further comprising time stamping the received data traffic, and wherein instructing the second monitoring container to instantiate a monitoring function, further comprises instructing the second monitoring container to instantiate a monitoring function to calculate latency of the time stamped data traffic.

15. The method according to claim 11, further comprising receiving further data traffic addressed to or originating within a third task container, wherein the further data traffic is mirrored by the switch attached to said third task container.

16. A server node configured to establish a monitoring function monitoring performance metrics of data traffic of a first task container of a server node, the server node being adapted to:
   provide a first monitoring container adapted to execute the monitoring function, when a task of the first task container has started;
   instantiate the monitoring function in the first monitoring container;
   mirror data traffic addressed to, or originating within, the first task container, to the first monitoring container; and
   execute the monitoring function in the first monitoring container monitoring the performance metrics of the data traffic being mirrored.

17. The server node according to claim 16, further being adapted to attach the first monitoring container to a switch that is attached to the first task container, and to configure the switch to mirror data traffic addressed to, or originating within, the first task container.

18. The server node according to claim 16, further being adapted to mirror data traffic selected based on one or more of: a hash function, a network tuple, and an identity of first and/or second task container.

19. The server node according to claim 16, further being adapted to instantiate a monitoring container or using an already existing monitoring container within the server node.

20. The server node according to claim 16, where the data traffic addressed to, or originating within, the first task container, is originated within or addressed to, a second task container, respectively, where the server node further is adapted to request information about a second monitoring container associated to the second task container, and if having received information about a second monitoring container, instruct the second monitoring container to instantiate a monitoring function monitoring said performance metrics of data traffic of the second task container.

21. The server node according to claim 20, further being adapted to identify an address of the second task container.

22. The server node according to claim 21, wherein the address of the second task container is an address within the server node or within another server node.

23. The server node according to claim 20, further being adapted to time stamp the data traffic being mirrored and to instruct the second monitoring container to instantiate a monitoring function to calculate latency of the time stamped data traffic.

24. The server node according to claim 16, further being adapted to receive further data traffic mirrored by a virtual switch attached to a second task container, where said further data traffic is addressed to, or originated within, said second task container.

25. The server node according to claim 16, wherein the task of the first task container comprises virtual network function, VNF.

26. A server node configured to establish a monitoring function to monitor performance metrics of data traffic of a first task container in a virtual environment, a server node comprising:
   a processor; and
   a memory storing a computer program comprising computer program code which when run in the processor, causes the server node to:
   provide a first monitoring container adapted to execute the monitoring function, when a task of the first task container has started;
   instantiate the monitoring function in the first monitoring container;
   mirror data traffic addressed to, or originated within, the first task container, to the first monitoring container; and
   execute the monitoring function in the first monitoring container monitoring the performance metrics of the data traffic being mirrored.

27. A virtual container on a non-transitory computer readable medium adapted to, using a processor, execute a monitoring function monitoring performance metrics of data traffic of a first task container, where the virtual container is further adapted to:
   receive an instantiation message to instantiate the monitoring function;
   instantiate the monitoring function in the virtual container;
   receive data traffic communicated between the first task container and a second task container, which data traffic is mirrored to the virtual container by a switch that is attached to the first task container; and
   execute the monitoring function monitoring the performance metrics of the mirrored data traffic.

28. The virtual container according to claim 27, further being adapted to receive an attachment message, and to attach to the switch, as instructed by the attachment message.

29. The virtual container according to claim 27, where the data traffic addressed to, or originating within, the first task container, is originated within or addressed to, the second task container, respectively, the virtual container further being adapted to request information about a second monitoring container associated to the second task container, and if having received information about the second monitoring container, instruct a second virtual container to instantiate a monitoring function monitoring said performance metrics of data traffic of the second task container.

30. The virtual container according to claim 29, further being adapted to time stamp the received data traffic, and to instruct the second virtual container to instantiate a monitoring function to calculate latency of the time stamped data traffic.

31. The virtual container according to claim 27, further being adapted to receive further data traffic addressed to or originated within a third task container, where the further data traffic is mirrored by a virtual switch attached to said third task container.

* * * * *